(12) United States Patent
Naoki

(10) Patent No.: US 8,757,577 B2
(45) Date of Patent: Jun. 24, 2014

(54) SLIDE RAIL DEVICE FOR VEHICLE

(71) Applicant: Shiroki Corporation, Fujisawa (JP)

(72) Inventor: Hayashi Naoki, Fujisawa (JP)

(73) Assignee: Shiroki Corporation, Fujisawa-Shi, Kanagawa (JP)

( * ) Notice: Subject to any disclaimer, the term of this patent is extended or adjusted under 35 U.S.C. 154(b) by 0 days.

(21) Appl. No.: 13/746,799

(22) Filed: Jan. 31, 2013

(65) Prior Publication Data

US 2013/0134281 A1 May 30, 2013

Related U.S. Application Data

(63) Continuation of application No. PCT/JP2011/061309, filed on May 17, 2011.

(30) Foreign Application Priority Data

Jul. 22, 2010 (JP) ................................ 2010-164584

(51) Int. Cl.
 *B60N 2/08* (2006.01)
(52) U.S. Cl.
 USPC ..................... 248/429; 248/423; 297/344.1
(58) Field of Classification Search
 CPC .................................. B60N 2/07; B60N 2/08
 USPC .................. 248/419, 423, 429, 424, 430; 297/344.1; 296/65.13
 See application file for complete search history.

(56) References Cited

U.S. PATENT DOCUMENTS 2,352,358 A * 6/1944 Andersen ........................ 384/47

5,806,825 A * 9/1998 Couasnon ..................... 248/429
6,902,235 B2 * 6/2005 Rohee et al. .................. 297/334
7,314,204 B2 * 1/2008 Kohmura ..................... 248/430

(Continued)

FOREIGN PATENT DOCUMENTS

FR       2901193 A1 * 11/2007
JP       07-195964       8/1995

(Continued)

OTHER PUBLICATIONS

International Search Report for PCT/JP2011/061309; Date of actual completion of the international search: Jul. 6, 2011; Date of mailing of the international search report: Jul. 19, 2011.
Elcat Spa, "Device of longitudinally adjusting automobile seat," Patent Abstracts of Japan, Publication Date: Aug. 1, 1995; English Abstract of JP-07 195964.

(Continued)

*Primary Examiner* — Terrell McKinnon
*Assistant Examiner* — Eret McNichols
(74) *Attorney, Agent, or Firm* — Millen, White, Zelano & Branigan, P.C.

(57) ABSTRACT

A slide rail device includes forward/rearward-movement restricting grooves formed on an upper rail; lock portions which are movable in the forward and/or rearward direction relative to the upper rail, wherein the lock portions are lock-engaged with the lock grooves and the forward/rearward-movement restricting grooves when the lock release lever is positioned at the locked position, and the lock portions are released from the lock grooves when the lock release lever is positioned at the unlocked position; and restricting lugs formed on an upper rail, wherein the restricting lugs restrict the lock portions from moving forward or rearward from the forward/rearward-movement restricting grooves, to which the lock portions correspond, by the lock portions coming in contact with the restricting lugs when the lock release lever is positioned at the unlocked position.

9 Claims, 9 Drawing Sheets

(56) References Cited

U.S. PATENT DOCUMENTS

| | | | |
|---|---|---|---|
| 2004/0108762 A1* | 6/2004 | Borbe et al. | 297/344.11 |
| 2009/0218843 A1* | 9/2009 | Wojatzki et al. | 296/65.13 |
| 2010/0133407 A1* | 6/2010 | Fujieda et al. | 248/429 |

FOREIGN PATENT DOCUMENTS

| | | | | |
|---|---|---|---|---|
| JP | 2002 154355 | | 5/2002 | |
| JP | 2003252086 A | * | 9/2003 | |
| JP | 4013591 | | 11/2007 | |
| JP | 2008 265695 | | 11/2008 | |
| JP | 2010 125955 | | 6/2010 | |
| WO | PCT/JP2008/066154 | * | 3/2009 | B60N 2/06 |

OTHER PUBLICATIONS

Aisin Seiki Co Ltd., "Seat sliding device," Patent Abstracts of Japan, Publication Date: May 28, 2002; English Abstract of JP-2002 154355.

T S TEC KK, Suzuki Motor Corp., "Slide lock mechanism of seat for automobile," Patent Abstracts of Japan, Publication Date: Nov. 6, 2008; English Abstract of JP-2008 265695.

Imasen Electric Ind Co Ltd., "Slide rail apparatus for vehicle," Patent Abstracts of Japan, Publication Date: Jun. 10, 2010; English Abstract of JP-2010 125955.

Aisin Seiki Co Ltd., "Seat slide device," Patent Abstract of Japan, Publication Date: Sep. 9, 2003; English Abstract of JP4013591.

* cited by examiner

US 8,757,577 B2

SLIDE RAIL DEVICE FOR VEHICLE

RELATED APPLICATION DATA

This is a continuation of International Application No. PCT/JP2011/061309, with an international filing date of May 17, 2011, which is herein incorporated by reference in its entirety.

TECHNICAL FIELD

The present invention relates to a slide rail device for a vehicle which supports a seat in a slidable manner.

BACKGROUND ART

As a conventional slide rail device for vehicle, a device is known which is equipped with a left and right pair of lower rails extending in a forward/rearward direction which include a plurality of lock grooves, extending vertically while being open at the lower ends thereof; upper rails which support the seating portion of a seat and are slidably supported by the left and right pair of lower rails, a lock-release lever which is partly accommodated in the internal spaces of each upper rail and which are supported by each upper rail to be rotatable in the vertical direction between a locked position and an unlocked position, a locking portion which fits into the lock grooves when the lock-release lever is positioned at the locked position and which comes out downwardly from the lock grooves when the lock-release lever is positioned at the unlocked position, and a biaser (spring) which biases and rotates the locking lever toward the locked position.

Therefore, when an occupant applies no operating force to the operating lever, the slide positions of the seat and the upper rails with respect to the lower rails are maintained since the lock-release levers which are held in the locked position by the biasing force of the biaser and the locking portion is engaged with some of the lock grooves. On the other hand, upon an occupant rotating the lock-release lever to the unlocked position against the biasing force of the biaser, the locking portion is released from the engagement with the lock grooves to thereby allow the seat and the upper rails to slide relative to the lower rails.

CITATION LIST

Patent Literature

PATENT LITERATURE 1: Japanese Patent No. 4,013,591
PATENT LITERATURE 2: Japanese Unexamined Patent Publication No. H07-195964

SUMMARY OF INVENTION

Technical Problem

In the slide rail device, for a vehicle, that has the above described structure, sometimes forward/rearward-movement-restricting grooves which are downwardly open are formed in the upper rails, a spring member which moves vertically in response to the rotational movement of the lock-release lever and which can move slightly in the forward/rearward direction is supported by the upper rails; and the above-described locking portion, which is disengageably engaged with the forward/rearward-movement-restricting grooves and the lock grooves, is formed on the spring member.

In this slide rail device, immediately after the locking portion comes out downwardly from the lock grooves and the forward/rearward-movement-restricting grooves in accordance with the rotational movement of the lock-release lever to the unlocked position, it is possible for the locking portion (spring member) to slightly move forwardly/rearwardly with respect to the upper rails.

However, when the lock-release lever is returned to the locked position if the lock member moves forwardly/rearwardly, there is a risk of the locking portion colliding with the lower end surface of the upper rail and not being able to return within the forward/rearward-movement-restricting grooves.

The present invention provides a slide rail device for a vehicle in which a locking member that constitutes a member for restricting a sliding movement of the upper rail with respect to the lower rail and moves in response to a rotational operation of a lock-release lever is forwardly/rearwardly movable with respect to the upper rail, while the locking portion can be securely returned inside the forwardly/rearwardly-restricted grooves formed in the upper rail when the lock-release lever is returned to the locked position.

Solution to Problem

A slide rail device for a vehicle according to the prevent invention is characterized by including a lower rail which extends in a forward/rearward direction and is provided with lock grooves which extend in an upward/downward direction and are open at one end thereof; an upper rail which is supported by the lower rail to be slidable in the forward/rearward direction; a lock release lever which is provided with a rail-incorporated portion positioned between the upper rail and a bottom wall of the lower rail, and supported by the upper rail to be upwardly/downwardly rotatable between a locked position and an unlocked position; forward/rearward-movement restricting grooves which are formed on the upper rail, the forward/rearward-movement restricting grooves extending in the upward/downward direction and are open at the same end as that of the lock grooves; lock portions which are movable in at least one of the forward direction and the rearward direction relative to the upper rail, wherein the lock portions are lock-engaged with the lock grooves and the forward/rearward-movement restricting grooves when the lock release lever is positioned at the locked position, and wherein the lock portions are released from the lock grooves when the lock release lever is positioned at the unlocked position; and restricting lugs which are formed on the upper rail and are positioned on the opposite side of the open ends of the forward/rearward-movement restricting grooves with respect to closed ends of the forward/rearward-movement restricting grooves, wherein the restricting lugs restrict the lock portions from moving forward or rearward from the forward/rearward-movement restricting grooves, to which the lock portions correspond, by the lock portions coming in contact with the restricting lugs when the lock release lever is positioned at the unlocked position.

A rotational contact portion can be formed on an upper surface of the rail-incorporated portion, the rotational contact portion contacting a roof surface of said upper rail, and a biaser which biases the rail-incorporated portion toward the roof surface.

According to such a configuration, it is possible to provide a simplified structure compared to that in which a rotational shaft is provided on one of the upper rail and the lock-release lever, and a bearing hole, into which the rotational shaft is engaged, is formed in the other of the upper rail and the lock-release lever.

The biaser can be provided with the lock portions, wherein the biaser rotationally biases the lock release lever toward said locked position.

According to such a configuration, since the biaser and the locking portion can be used together, it is possible to reduce the number of components compared to the case where the biaser and the locking portion are separate members.

Stopper portions, which can come in contact with the restricting lugs, can be provided on the lower rail and to be positioned on a straight line extending in the forward/rearward direction and through the restricting lugs.

According to such a configuration, since the restricting lug can also be used as restrictor that restricts the sliding range of the upper rail with respect to the lower rail, it is possible to reduce the number of components compared to the case where a restrictor that is separate from the restricting lug is provided on the upper rail.

Advantageous Effects of Invention

According to the present invention, upon rotating the lock-release lever to the unlocked position, since the locking portion can be mechanically restricted from moving forwardly or rearwardly from the corresponding forward/rearward-movement restricting grooves by the restricting portion, upon the locking portion coming out from the forward/rearward-movement restricting grooves and the lock-release lever returning to the locked position, the locking portion smoothly moves into the forward/rearward-movement restricting grooves. Accordingly, it is possible to securely return to a locked state.

DESCRIPTION OF EMBODIMENTS

Figure 1:
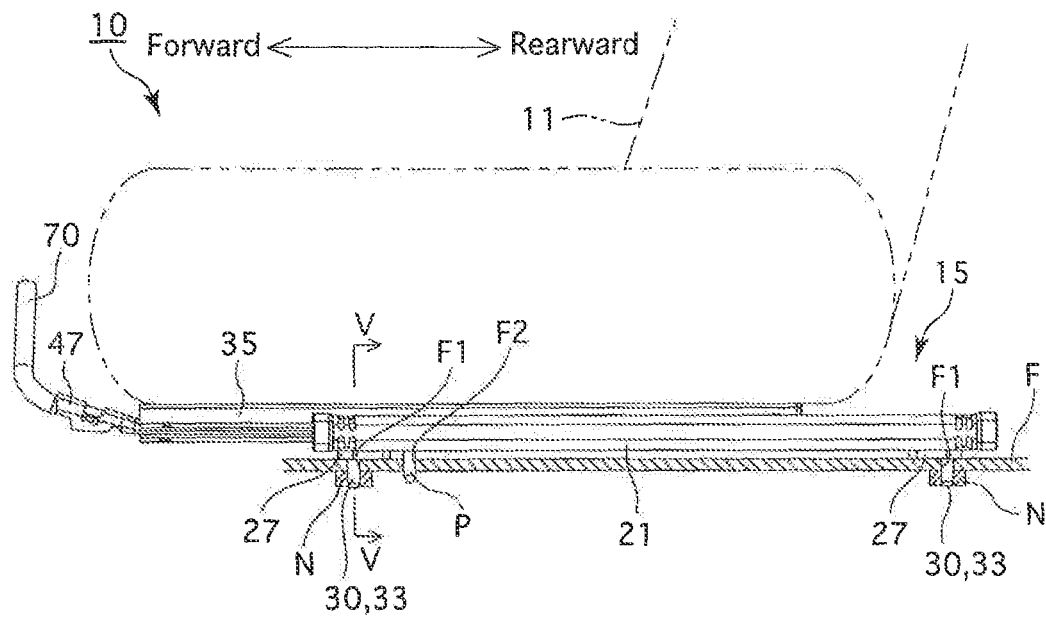
FIG. 1 is a side view of a slide seat device in an embodiment of the present invention when upper rails have slid to the front end position.
Figure 2:
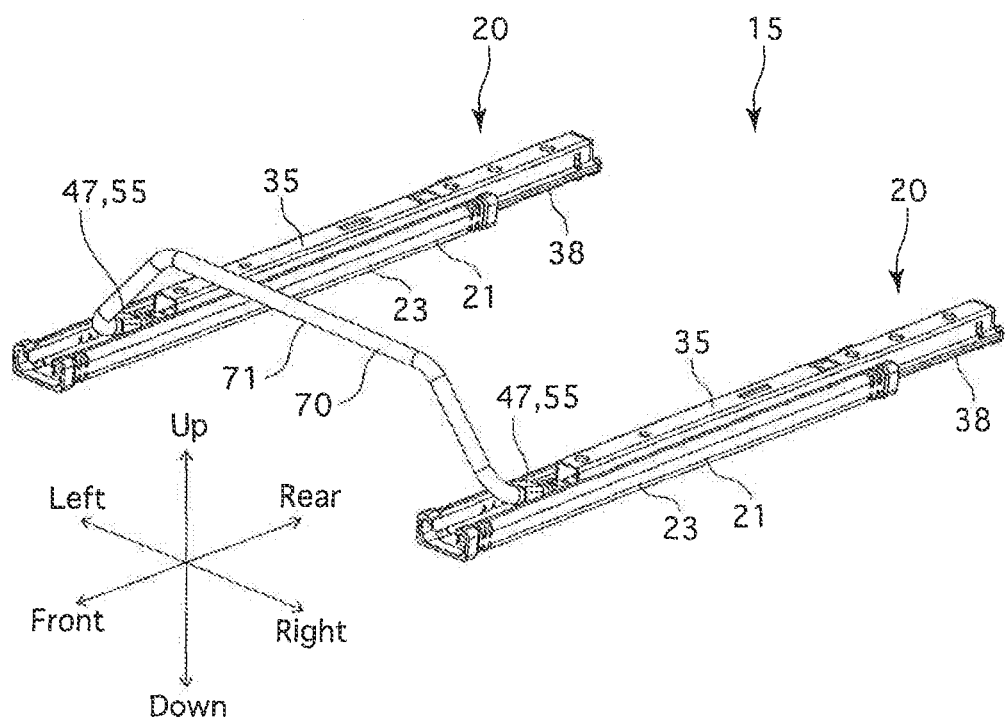
FIG. 2 is a front perspective view of the slide rail device, viewed obliquely from above.

A first embodiment of the present invention will be hereinafter discussed with reference to FIGS. 1 through 17. Directions described in the following description are defined based on the directions of arrows shown in the drawings.

A slide seat device 10 is installed onto a floor board F (see FIG. 1) that constitutes a vehicle interior floor of an automobile (vehicle), not shown in the drawings. Four screw holes (two front and rear left holes and two front and rear right holes) F1 are formed through the floor board F for one slide seat device 10, and weld nuts N which are coaxial with the screw holes F1 are fixed to a lower surface of the floor board F at positions corresponding to each screw hole F1, respectively. In addition, positioning holes F2 are formed through the floor board F at positions immediately behind the front screw holes F1, respectively. The slide seat device 10 is provided with a slide rail device 15 that constitutes a lower part of the slide seat device 10, and a seat 11 which is fixed to upper surfaces of the slide rail device 15 (upper rails 35).

The detailed structure of the slide rail device 15 will be discussed hereinafter.

The slide rail device 15 is provided, as large components thereof, with a pair of left and right rail units 20 and a loop handle 70 which connects the front ends of the left and right rail units 20. The left and right rail units 20 have the same structure while the loop handle 70 has a bilaterally-symmetrical shape, and therefore, the slide rail device 15 is bilaterally symmetrical as a whole.

The left and right rail units 20 have the structure which will be discussed hereinafter.

Figure 4:
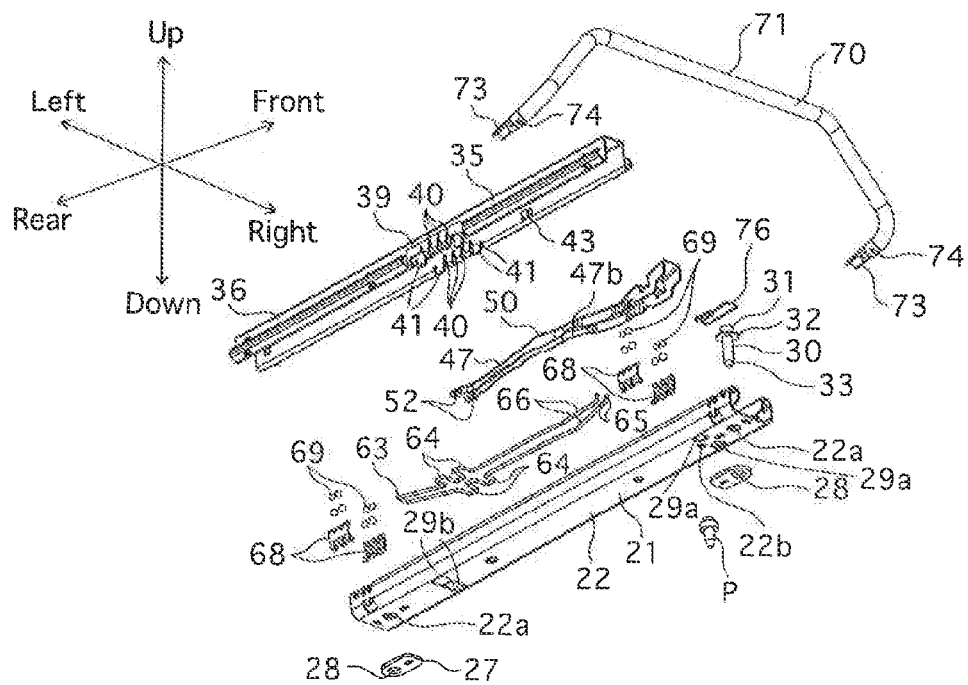
FIG. 4 is an exploded front perspective view of the slide rail device with the left rails omitted, viewed obliquely from below.
Figure 5:
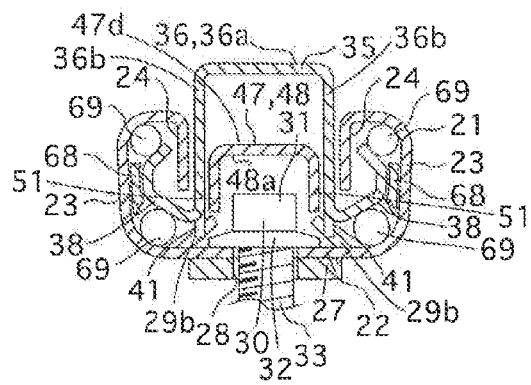
FIG. 5 is a sectional view taken along the line V-V shown in FIG. 1.
Figure 10:
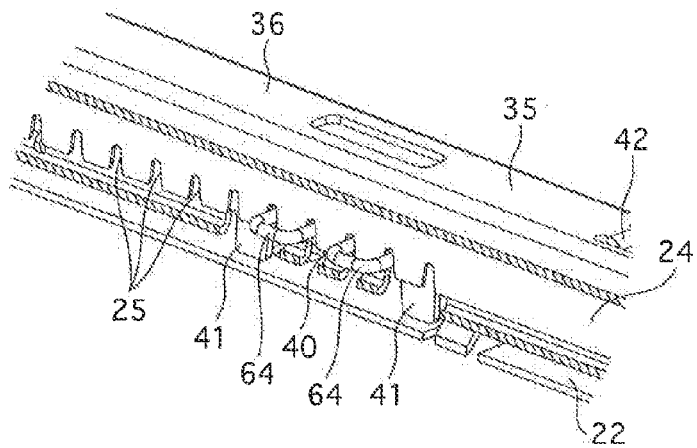
FIG. 10 is an enlarged perspective view of one upper rail and the associated lower rail in a locked state with an outer side wall of the lower rail, an upright wall and a locking wall of the upper rail cut out.
Figure 11:
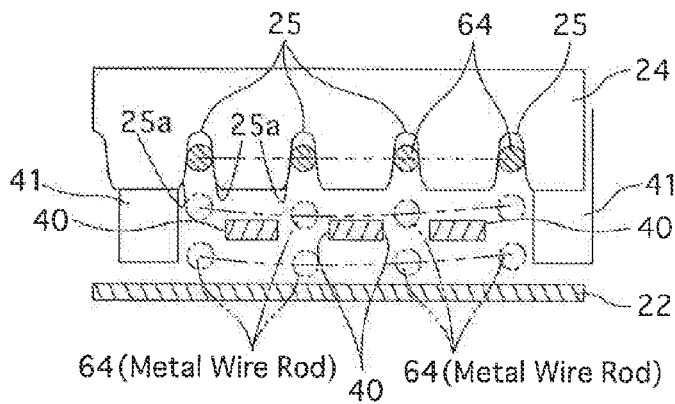
FIG. 11 is a schematic side view showing a state where a lock spring is in a locked position and a state where the same lock spring is in an unlocked position.

The rail unit 20 is provided with a lower rail 21 which is placed on the floor board F. The lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and a pair of left and right inner wall portions 24 which extend inward and thereafter downward from the top edges of the pair of left and right outer wall portions 23, respectively. As shown in FIGS. 4 and 10, etc., a large number of lock grooves 25 are formed in the lower edges of the left and right inner walls 24 and are arranged in the forward/rearward direction. As shown in FIG. 11, the width in the forward/rearward direction of each lock groove 25 increases downwardly, and the front edge and the rear edge at the lower ends of each lock groove 25 are provided with inclined guide surfaces 25a. In addition, as shown in FIG. 4, a pair of bolt insertion holes 22a are formed through the bottom wall 22 near the front and rear ends of the bottom wall 22, respectively, and a positioning hole 22b is formed through the bottom wall 22 immediately behind the front bolt insertion hole 22a. Spacers 27 are fixed to the undersurface of the bottom wall 22 near front and rear ends thereof, respectively, and through-holes 28 formed through the two spacers 27 are coaxial with the bolt insertion holes 22a, respectively. Furthermore, as shown in FIG. 4 and FIG. 5, a pair of left and right front stopper portions 29a are formed at the front part of the bottom wall 22 by being cut and raised to constitute bilaterally symmetrical members that are inclined with respect to the vertical direction, and a pair of left and right rear stopper portions 29b are formed at the rear part of the bottom wall 22 by being cut and raised to constitute members having the same shapes as those of the front stopper portions 29a.

A front and rear pair of fixing bolts 30 are inserted into the front and rear bolt insertion holes 22a of the bottom wall 22 from above, respectively. Each fixing bolt 30 is provided with a head 31 which constitutes the upper end of the fixing bolt 30, a flange 32 which is greater in diameter than the head 31 and the associated bolt insertion hole 22a, and is joined to the lower end of the head 31, and a threaded portion 33 which extends downward from a lower surface of the flange 32 and is slightly smaller in diameter than the associated bolt insertion hole 22a and through-hole 28.

Figure 3:
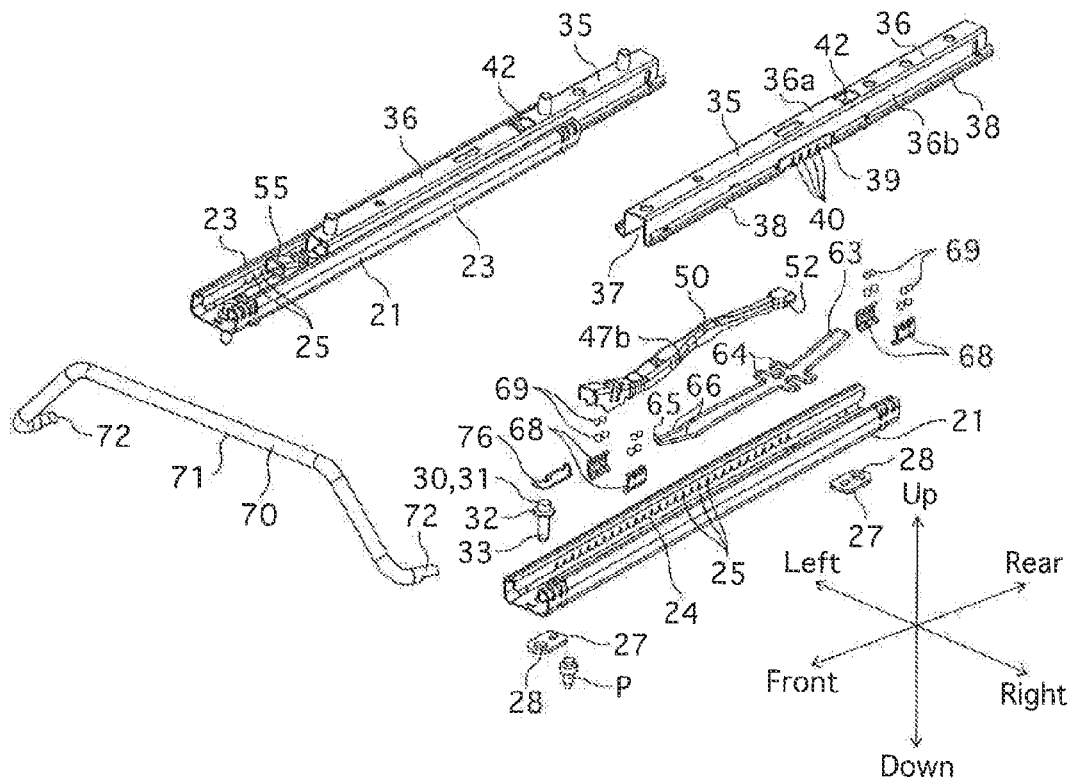
FIG. 3 is an exploded front perspective view of the slide rail device, viewed obliquely from above.
Figure 6:
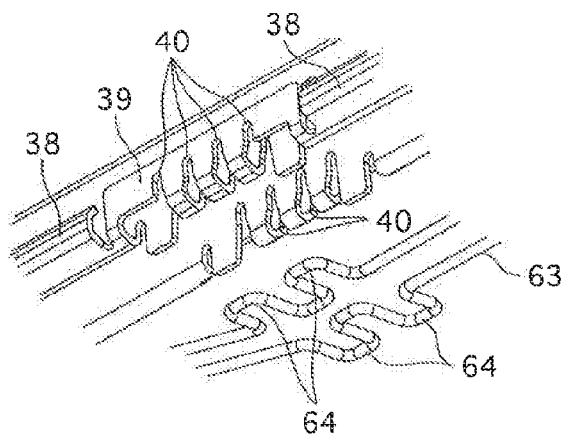
FIG. 6 is an enlarged perspective view of middle parts of one upper rail and a lock spring in a mutually separated state, viewed obliquely from below.
Figure 7:
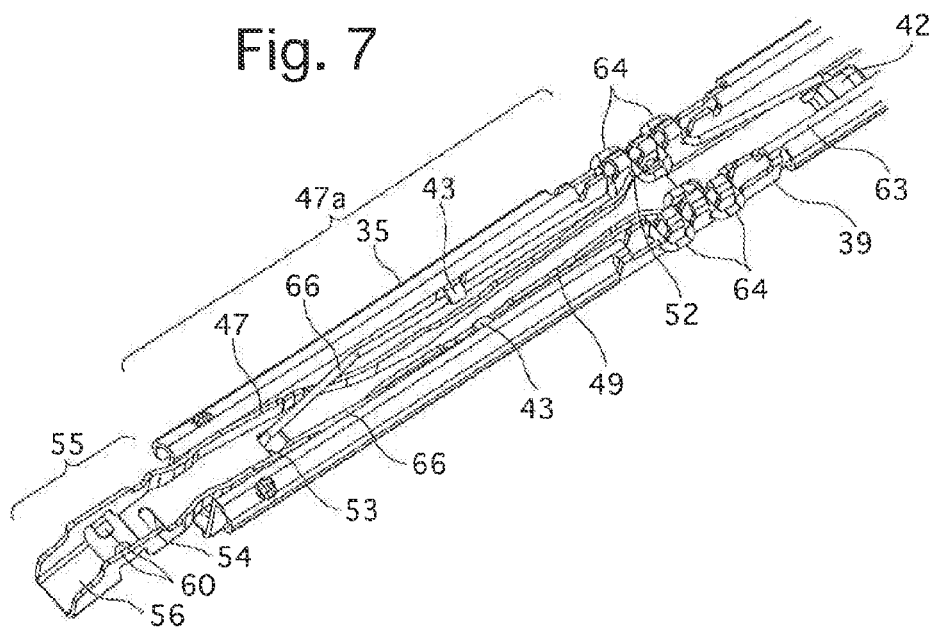
FIG. 7 is a perspective view of one upper rail, a lock-release lever and the lock spring in an assembled state, viewed obliquely from below.

The rail unit 20 is provided with an upper rail 35 that is slidable in the forward/rearward direction with respect to the associated lower rail 21. The upper rail 35 is a metal channel member which extends in the forward/rearward direction and the bottom thereof is open, and is provided with a base 36 (provided with a substantially-horizontal roof portion 36a and a pair of side wall portions 36b which extend downward from both left and right sides of the roof portion 36a) which is substantially inverted U-shaped in cross section and the internal space of which constitutes a lever accommodating groove 37, upright walls 38 which extend upward from the side wall portions 36b except central portions thereof in the longitudinal direction, and locking walls 39 which extend upward from the aforementioned central portions of the side wall portions 36b. As shown in FIGS. 3, 4 and 6, etc., four forward/rearward-movement restricting grooves 40 are formed to extend through the lower edges of the left and right locking walls 39 and the lower edges of the side wall portions 36b of the base 36 to extend upward. Furthermore, the lower ends of the side wall portions 36b of the base 36 are provided with a front and rear pair of restricting lugs 41, respectively, which are integrally formed with the side wall portions 36b and project downwardly so as to extend further downward than the lower edges (open ends) of the forward/rearward-movement restricting grooves 40. In other words, the restricting lugs 41 are positioned on the opposite side of the open ends of the forward/rearward-movement restricting grooves 40 with respect to closed ends of the forward/rearward-movement restricting grooves 40. In addition, as shown in FIGS. 3 and 7, etc., the base 36 is provided, in the vicinity of a central portion of the roof portion 36a, with a locking lug 42 which is formed by cutting and raising a portion of the base 36 to extend downward and subsequently rearward, and is provided, on portions of the left and right side wall portions 36b which are positioned slightly in front of central portions of the left and right side wall portions 36b, with locking lugs 43 which are formed by cutting and raising portions of the left and right side wall portions 36b to extend inward.

Each rail unit 20 is further provided with a lock-release lever 47 and a lock spring (biaser) 63 that are installed in the associated upper rail 35.

The lock-release lever 47 is a press-molded product formed from a metal plate and also a metal channel member which extends in the forward/rearward direction and the bottom thereof is open, and is provided with a base wall 47d and side walls 51 which extend downward from both left and right side edges of the base wall 47d. The lock-release lever 47 has a substantially inverted U-shaped cross section over the length thereof, a portion of the lock-release lever 47 immediately in front of a central portion thereof in the longitudinal direction thereof constitutes a middle portion 48, the internal space of which forms a receptive depressed portion 48a, and a portion of the lock-release lever 47 immediately behind the middle portion 48 is formed as a narrow-width portion 49 which is narrower in width than portions of the lock-release lever 47, which are positioned in front and behind the narrow-width portion 49. In addition, ridges 47b which are formed on outer side surfaces (outer side surfaces in the vicinity of the joint between the middle portion 48 and the narrow-width portion 49) of the left and right side walls 51 to extend in the vertical direction are formed as R-planes (see FIGS. 3, 4, 8, 9 and 13). As shown in FIGS. 3, 4, 8 and 9, a rotational contact protrusion (rotational contact portion) 50 which extends in the leftward/rightward direction protrudes from an upper surface of the lock-release lever 47. In addition, spring-hook grooves 52 are formed on lower surfaces of the left and right side walls 51 of the lock-release lever 47 in the vicinity of the rear ends of the left and right side walls 51, and a lock-spring catching hole 53 and a lock-spring catching hole 54 are formed through the base wall 47d of the lock-release lever 47. Additionally, ridges 52a substantially identical in shape to the ridges 47b are formed on the left and right side walls 51 immediately in front of the spring-hook grooves 52, respectively (see FIGS. 8, 9 and 13). A portion of the lock-release lever 47 which is positioned in front of the middle portion 48 constitutes a connecting portion 55 that is greater in width than the middle portion 48, and the portion of the lock-release lever 47 which is positioned behind the connecting portion 55 constitutes a rail-incorporated portion 47a. The undersurface of the roof of the front end of the connecting portion 55 is formed as a flat front restricting portion 56, and a space immediately below the front restricting portion 56 constitutes a front allowance space 57. In addition, a depressed portion 58 is formed on the connecting portion 55 at a position immediately behind the front restricting portion 56, and the space created by the depressed portion 58 constitutes a rear allowance space 59. Furthermore, substantially-horizontal rear restricting lugs 60 (the upper surfaces of which constitute rear restricting portions 60a) which extend in directions to approach each other are projected from the left and right lower edges of the depressed portion 58. Furthermore, a combination of the front allowance space 57 and the rear allowance space 59 constitutes a connecting space 61.

The lock spring 63 is a substantially bilaterally-symmetrical member formed by bending a metal wire rod. A pair of front and rear pairs lock portions 64 which extend substantially horizontally outwards are formed on portions of both left and right side portions of the lock spring 63 which are positioned slightly behind central portions thereof in the longitudinal direction, respectively. A portion of the lock spring 63 which is positioned behind the lock portions 64 extends obliquely rearwardly upwards from the lock portions 64 when in a free state, and a portion of the lock spring 63 which is positioned in front of the lock portions 64 extends obliquely forwardly upwards when in a free state. The lock spring 63 is provided at the front end thereof with a pair of left and right front-end locking lugs 65 which project upward, and portions of the lock spring 63 which are positioned immediately behind the front-end locking lugs 65 constitute lever pressing portions 66.

Figure 8:
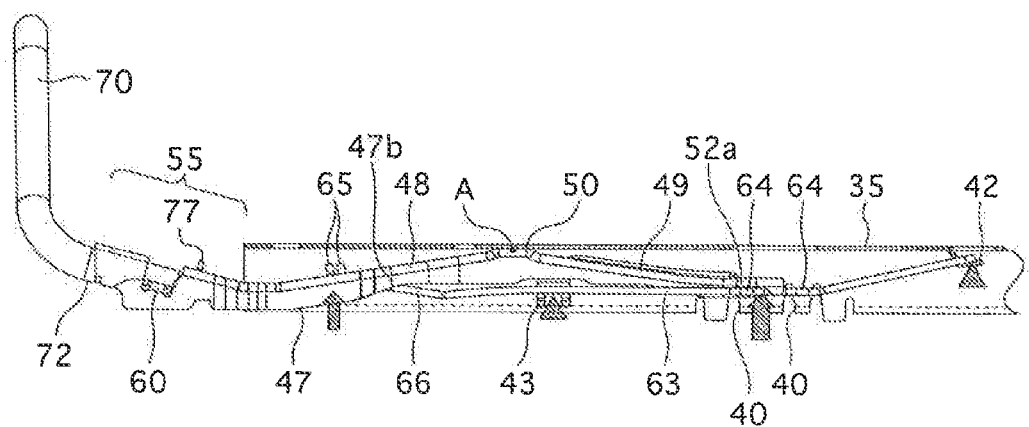
FIG. 8 is a side view of one upper rail, the lock-release lever and a loop handle in a locked state, wherein only the upper rail is shown as a longitudinal sectional side view.
Figure 9:
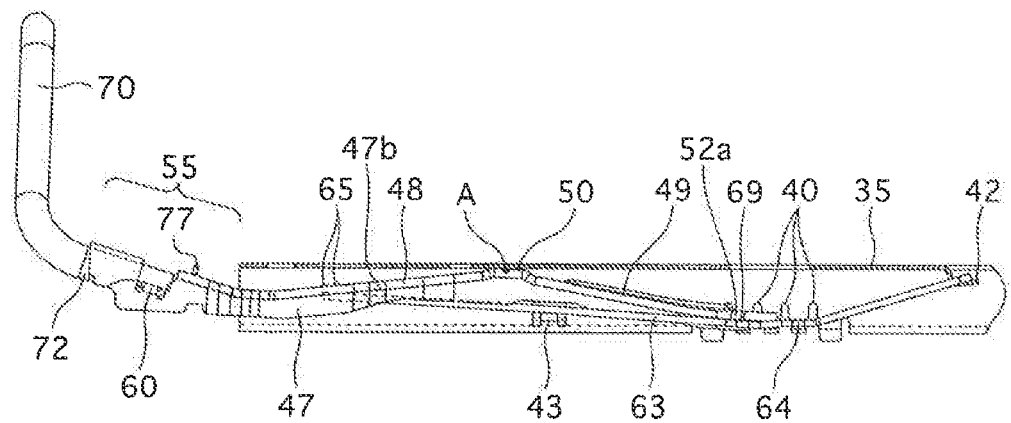
FIG. 9 is a side view similar to that of FIG. 8 in an unlocked state.

The rail-incorporated portion 47a of the lock-release lever 47 is accommodated in the lever accommodating groove 37 of the associated upper rail 35, and the rotational contact protrusion 50 is in contact with a roof surface of the base 36 (see a contact portion "A" in FIGS. 8 and 9; an interspace is formed between the upper surface of the rail-incorporated portion 47a except the rotational contact protrusion 50 and a roof surface of the lever accommodation groove 37). As shown in FIGS. 7 through 9, the rear end of the lock spring 63 is lock-engaged with the locking lug 42 (see the triangular mark in FIG. 8), portions of the lock spring 63 which are slightly in front of the lock portions 64 are lock-engaged with the left and right locking lugs 43 (see the triangular mark in FIG. 8), each lock portion 64 is lock-engaged with the associated guide groove 40 from below, and the pair of left and right front-end locking lugs 65 are inserted into the lock-spring catching hole 53 from below. Moreover, portions of the left and right lever pressing portions 66 in the vicinity of the front ends thereof are lock-engaged with the rear edge of the lock-spring catching hole 53, and the spring-hook grooves 52 are lock-engaged with portions of the lock spring 63 from above which are positioned between the pair of lock portions 64. Installation of the lock spring 63 to the upper rail 35 and lock-release lever 47 in this manner puts the lock spring 63 in a state where the front-end locking lugs 65 can move, with respect to the upper rail 35, within a minute moving range in which the locking engagement between the rear end of the lock spring 63 and the locking lug 42 is not released and the front-end locking lugs 65 are prevented from coming out of the lock-spring catching hole 53, and left and right portions (front half portions) of the lock spring 63 are respectively positioned in a left and right pair of spaces formed between the side walls 51 of the narrow-width portion 49 and the pair of side wall portions 36b of the upper rail 35 (see FIG. 7). In addition, the lock spring 63 that is accommodated in the lever accommodation groove 37 produces an upward biasing force (elastic force) by being elastically deformed (see arrows ↑ shown in FIG. 8), and accordingly, this biasing force causes the rotational contact protrusion 50 of the lock-release lever 47 to be pressed against the roof portion 36a of the base 36, which allows the lock-release lever 47 to rotate about the rotational contact protrusion 50 (about an phantom rotation axis extending in the leftward/rightward direction) about the contact portion A between the roof portion 36a and the rotational contact protrusion 50, and the lock-release lever 47 is held in the locked position shown in FIG. 8 when no upward external force is exerted on the connecting portion 55. On the other hand, exerting an upward external force on the connecting portion 55 against the biasing force of the lock spring 63 causes the lock lever 47 to rotate to the unlocked position shown in FIG. 9. Thereupon, as shown in FIG. 9, the spring-hook grooves 52 of the lock-release lever 47 depresses the portions of the lock spring 63 which are positioned between the pair of lock portions 64, so that each lock portion 64 escapes downward from the associated guide groove 40 (see FIG. 9 and phantom lines shown in FIG. 11).

An assembly made by inserting a combination of one upper rail 35, one lock release lever 47 and one lock spring 63, which are combined together in the above described manner, into one lower rail 21 from the front or rear end opening of the lower rail 21 constitutes one rail unit 20. When one rail unit 20 is assembled, the upright walls 38 and the locking walls 39 of the upper rail 35 enter the spaces formed between the outer wall portions 23 and the inner wall portions 24 as shown in FIG. 5, and a plurality of bearing balls 69, which are rotatably supported by retainers 68 installed in the aforementioned spaces, are in rotatable contact with both outer surfaces of the upright walls 38 and inner surfaces of the outer wall portions 23, which allows the upper rail 35 (and the lock release lever 47 and the lock spring 63) to slide in the forward/rearward direction with respect to the lower rail 21.

Furthermore, each restricting lug 41 of each upper rail 35 is positioned in between the front stopper portions 29a and the rear stopper portions 29b. Namely, the left front and rear restricting lugs 41 are positioned on a line extending in the forward/rearward direction from the left front stopper portion 29a to the left rear stopper portion 29b, and the right front and rear restricting lugs 41 are positioned on a line extending in the forward/rearward direction from the right front stopper portion 29a to the right rear stopper portion 29b. Therefore, the upper rail 35 is slidable along the lower rail 21 between a front end position (the position shown in FIG. 1) at which the front left and right restricting lugs 41 abut against the left and right front stopper portions 29a, respectively, from behind, and a rear end position (the position shown in FIG. 2) at which the rear left and right restricting lugs 41 abut against the left and right rear stopper portions 29b, respectively, from the front.

In addition, when the lock release lever 47 is in the locked position, the upper rail 35 is prevented from sliding with respect to the lower rail 21 because each lock portion is engaged with the associated the forward/rearward-movement restricting grooves 40 and lock grooves 25 from below as shown in FIGS. 8, 10 and by the solid lines of FIG. 11. On the other hand, rotating the lock release lever 47 down to the unlocked position causes each lock portion 64 which is engaged with some of the lock grooves 25 to be disengaged downward therefrom, as shown in FIG. 9 and by the phantom lines of FIG. 10, which allows the upper rails 35 to slide with respect to the lower rails 21.

The pair of left and right rail units 20 thus assembled are made to be parallel to each other and the positions thereof in the forward/rearward direction are made to coincide with each other (the sliding positions of the upper rails 35 with respect to the lower rails 21 are also made to coincide with each other); thereafter, the lower surface of the seating portion of the seat 11 is mounted on the top surfaces of the upper rails 35, and the seating portion of the seat 11 is fixed to the left and right upper rails 35 by a plurality of bolts, not shown in the drawings.

After the left and right rail units 20 and the seat 11 are integrated in this manner, a loop handle (handle) 70 is connected to the left and right lock release levers 47 using torsion springs (biaser) 76.

The loop handle 70 is a member made by bending a metal pipe having a circular shape in cross section and is provided with a grip portion 71 and a pair of rear-end connecting portions 72, wherein the grip portion 71 includes a linear portion extending in the leftward/rightward direction and a pair of oblique portions extending obliquely rearwardly downward from both left and right ends of the linear portion while the pair of rear-end connecting portions 72 extend rearward from both left and right ends of the grip portion 71. Depressed portions are formed on the lower surfaces of the left and right rear-end connecting portions 72, and the top surfaces in the depressed portions are formed as lower contact surfaces 73. In addition, lock-engaging grooves 74, which are positioned immediately in front of the lower contact surfaces 73 and extend in the leftward/rightward direction, are formed on the lower surfaces of the rear-end connecting portions 72.

Each torsion spring 76 is a substantially bilaterally-symmetrical member made by bending a metal wire rod. An upwardly projecting lug 77 is projected from the rear end of the torsion spring 76, and the front edge of the torsion spring 76 is formed as a front locking portion 78 which extends in the leftward/rightward direction. In addition, a locking projection 79 which projects upward is projected from the rear end of a front half of a side portion of the torsion spring 76, and a locking projection 80 which projects downward is projected from the front end of a rear half of the side portion.

Figure 12:
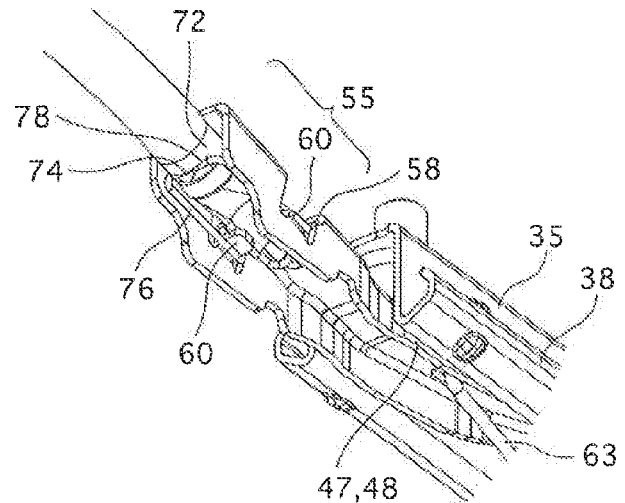
FIG. 12 is an enlarged perspective view of the front ends of one upper rail and the associated lock-release lever, and a rear end of the loop handle, viewed from below.
Figure 13:
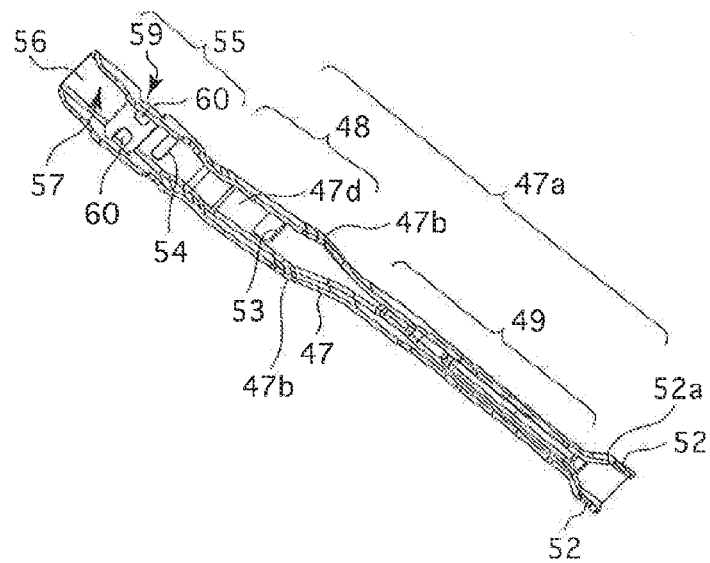
FIG. 13 is a perspective view of one lock-release lever, viewed from below.
Figure 14:
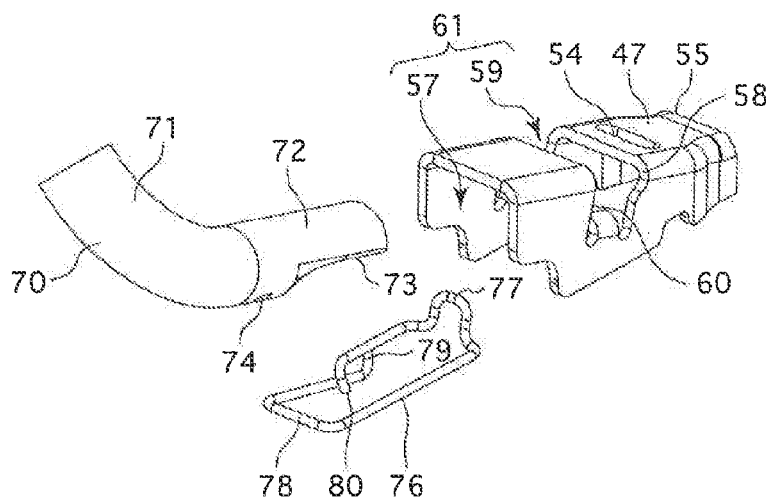
FIG. 14 is an enlarged exploded perspective view of the front end of one lock-release lever, a biasing spring and a rear end of the loop handle.
Figure 15:
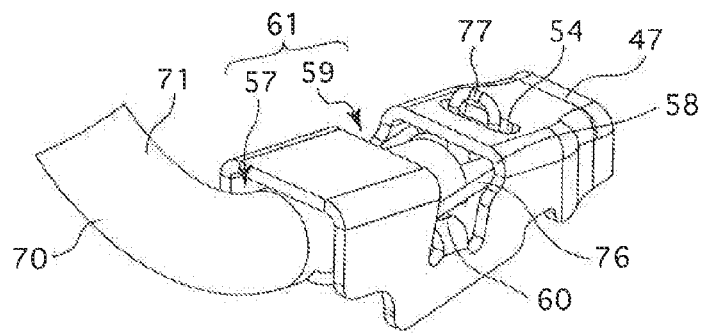
FIG. 15 is an enlarged perspective view of the front end of one lock-release lever, the biasing spring and a rear end of the loop handle in a mutually combined state.

To connect the loop handle 70 and the torsion springs 76 to the lock release levers 47, first the torsion springs 76 are inserted into the connecting spaces 61 of the left and right lock release levers 47, respectively, the torsion springs 76 are prevented from moving in the forward/rearward direction with respect to the connecting portions 55 by insertion of the upwardly projecting lugs 77 into the spring locking holes 54 from below, respectively; furthermore, a middle portion of a side part (the right-hand side part of one torsion spring 76 in the case of the right torsion spring 76, and the left-hand side part of one torsion spring 76 in the case of the left torsion spring 76) of one torsion spring 76 is mounted on the top surface (the rear restricting portion 60a) of one rear restricting lug 60 (the right-hand side rear restricting lug 60 in the case of the right connecting portion 55, and the left-hand side rear restricting lug 60 in the case of the left connecting portion 55), and the locking projection 79 of the other side part (the left-hand side part of one torsion spring 76 in the case of the right torsion spring 76, and the right-hand side part of one torsion spring 76 in the case of the left torsion spring 76) is lock-engaged with the rear edge of the other rear restricting lug 60 (the left-hand side rear restricting lug 60 in the case of the right connecting portion 55, and the right-hand side rear restricting lug 60 in the case of the left connecting portion 55) from below while the locking projection 80 of the other side part is lock-engaged with the front edge of the other rear restricting lug 60 from above (see FIGS. 12, 14 and 15). Subsequently, the left and right rear-end connecting portions 72 of the loop handle 70 are inserted into the left and right connecting spaces 61, respectively, the rear of each rear-end connecting portion 72 is inserted into the space between the left and right side parts of the associated torsion spring 76, and the lock-engaging grooves 74 are lock-engaged with the front locking portions 78.

Figure 16:
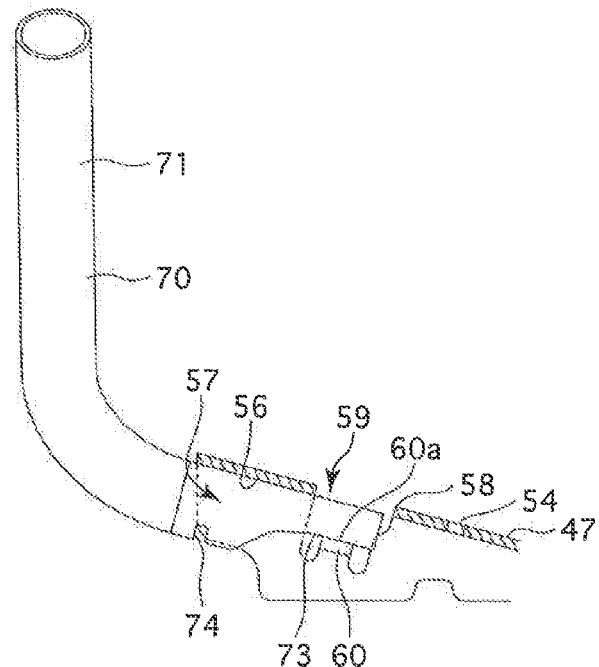
FIG. 16 is an enlarged longitudinal sectional side view of a rear end of the loop handle and the front end of the associated lock-release lever with the biasing spring omitted.
Figure 17:
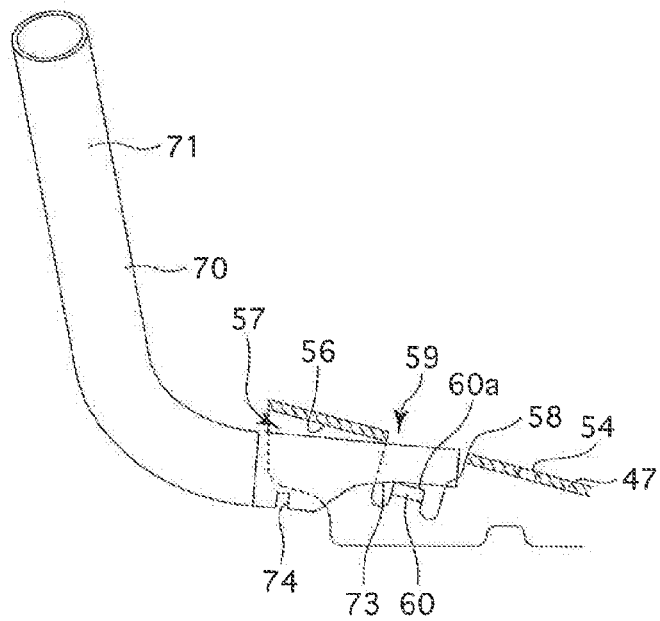
FIG. 17 is a view similar to that of FIG. 16 when the loop handle is depressed downwards.
Figure 18:
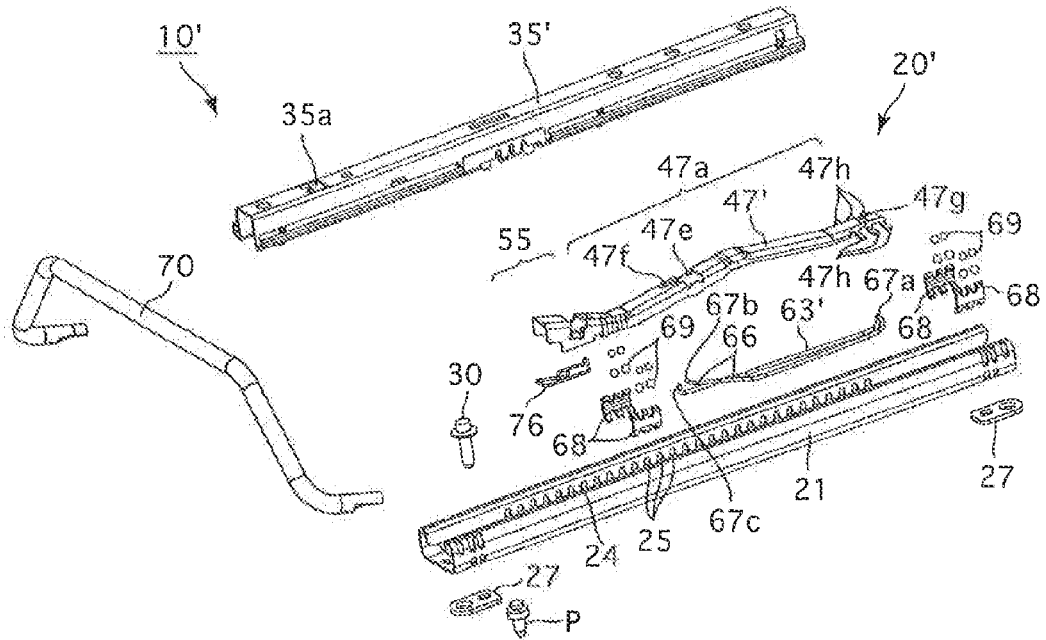
FIG. 18 is an exploded front perspective view, similar to that shown in FIG. 3, of the second embodiment.
Figure 19:
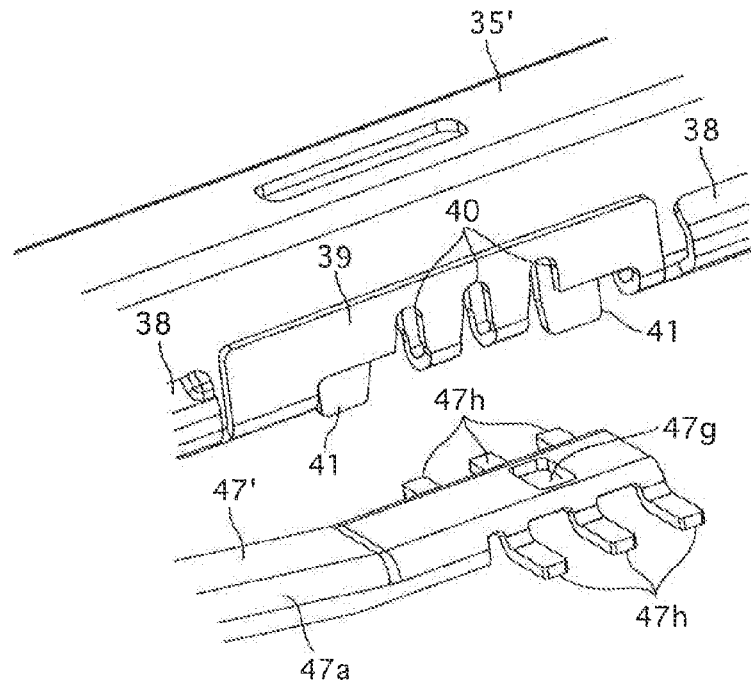
FIG. 19 is an enlarged perspective view of middle parts of one upper rail and a rear end of the associated lock-release lever.

Upon the slide seat device 10 being assembled by combining the loop handle 70 and the torsion springs 76 with the left and right rail units 20, the front of each torsion spring 76 (portions thereof in front of the rear restricting lugs 60) are slightly resiliently-deformed downward by the rear-end connecting portions 72, and accordingly, an upward biasing force (elastic force) produced by the front of each torsion spring 76 causes the front of each top surface of the rear-end connecting portions 72 to come in contact with the front restricting portions 56 and causes the lower contact surfaces 73 to come in contact with the rear restricting portions 60a of the left and right rear restricting lugs 60 (see FIG. 16). If an occupant manually holds the grip portion 71 and rotates the entire loop handle 70 upward by hand after the loop handle 70 is connected to the left and right lock release levers 47 (the connecting portions 55), this rotational force is exerted on the front restricting portions 56 and the rear restricting portions 60a from the rear-end connecting portions 72 to rotate the lock release levers 47 (the connecting portions 55) upward with the rear-end connecting portions 72, so that the lock release levers 47 in the locked position can be rotated to the unlocked position. On the other hand, rotating the entire loop handle 70 downward causes the left and right rear-end connecting portions 72 to rotate with engaging portions thereof with the front locking portions 78 as fulcrums (causes the rear portions of the rear-end connecting portions 72 to rotate upward in the rear allowance spaces 59 and causes the fronts of the rear-end connecting portions 72 to rotate downward in the front allowance spaces 57) to move away from the front restricting portions 56 and the rear restricting portions 60a, respectively (see FIG. 17), and therefore, this rotational force is not transmitted from each rear-end connecting portion 72 to the associated lock release lever 47 (the connecting portion 55 thereof) (neither the left or right lock release levers 47 rotate).

After fitting the lower halves of the positioning pins P, shown in FIGS. 1, 3 and 4, into the positioning holes F2 of the floor board F, the positioning holes 22b of the left and right lower rails 21 of the slide seat device 10 are respectively fitted onto the tops of the positioning pins P which project upward from the floor board F, thereby causing the undersurfaces of the spacers 27 that are fixed to the left and right lower rails 21 to come into contact with upper surfaces of the floor board F and causes each bolt insertion hole 22a and each through-hole 28 to be positioned immediately above the associated screw hole F1. Accordingly, the slide seat device 10 is fixed to the floor board F if each threaded portion 33 is made to be screw-engaged into the associated screw hole F1 until the lower surfaces of the flange 32 of the fixing bolts 30 come into pressing contact with an upper surface of the bottom wall 22.

In the above-described embodiment of the slide seat device 10, since each lock release lever 47 is rotationally supported by the associated upper rail 35 by each rotational contact protrusion 50 contacting the roof surface of the corresponding base 36 while utilizing the biasing force of the lock spring 63, without providing a structure on the upper rail 35 and the lock release lever 47 for rotationally supporting the lock release lever 47 on the upper rail 35 (such as a rotational shaft on the upper rail 35 and a bearing hole in the lock release lever 47 that is rotationally fit-engaged onto this rotational shaft), the structure thereof is simple.

Furthermore, although a restricting device (the rear end of the lock spring 63 and the locking lug 42) exists between the upper rail 35 and the lock release lever 47 which restricts the forward movement of the lock release lever 47 relative to the upper rail 35, a device which restricts the rearward movement of the lock release lever 47 relative to the upper rail 35 does not exist.

However, when the lock release lever 47 is in the locked position, since the lock portions 64 of the lock spring 63 are engaged with the forward/rearward-movement restricting grooves 40 (and the lock grooves 25 of the lower rail 21) of each upper rail 35, the forward/rearward movement of each lock release lever 47 relative to each respective upper rail 35 is restricted by this engagement. Furthermore, when each lock release lever 47 is positioned in the unlocked position, the lock portions 64 of the lock spring 63 are sometimes released downwardly from the forward/rearward-movement restricting grooves 40 of the upper rail 35 in addition to the lock grooves 25 of the lower rail 21 (see the lower lock portion 64 depicted by the lower phantom line in FIG. 11). However, in this case, as shown in FIG. 11, the forward/rearward movable range of the lock spring 63 (lock portions 64) is mechanically restricted by the front and rear restricting lugs 41 to within a predetermined range. Therefore, regardless of whether the lock release lever 47 is in the locked position or the unlocked position, since the lock-engagement of the rear end of the lock spring 63 with the locking lug 42 is not released by a large rearward movement of the lock release lever 47 relative to the upper rail 35, a steady and reliable rotational action of the lock release lever 47 relative to the upper rail 35 can be achieved.

Furthermore, when the front and rear restricting lugs 41 restrict the forward/rearward movement of the lock portions 64 within the above-mentioned predetermined range while the lock release lever 47 is positioned at the unlocked position, even if the lock portions 64 are released below the forward/rearward-movement restricting grooves 40, as shown in the lower phantom. line FIG. 11, the entire metal wire rod which constitutes the lock portions 64 is positioned directly below the corresponding forward/rearward-movement restricting grooves 40 (is not positioned forward from the front edges of the corresponding forward/rearward-movement restricting grooves 40 and is not positioned rearward from the rear edges of the forward/rearward-movement restricting grooves 40). Accordingly, when the lock release lever 47 is thereafter moved back to the locked position, the lock portions 64 (metal wire rod) which are moved upward and pass through the corresponding forward/rearward-movement restricting grooves 40 smoothly enter into the corresponding lock grooves 25 while being guided by the front or rear inclined guide surfaces 25a of the lock grooves 25 (or without contacting the inclined guide surfaces 25a) until the upper portions of the lock grooves 25. Accordingly, the rail units 20 can be securely returned to a locked state.

Additionally, the rotation support structure for the loop handle 70 (the rear-end connecting portions 72) with respect to the connecting portions 55 has a simple structure because the connecting portions 55 of the lock release levers 47 are also not provided with rotational shafts for rotatably supporting the rear-end connecting portions 72 of the loop handle 70.

A second embodiment of the present invention will be hereinafter discussed with reference to FIGS. 18 through 22. Note that members that are the same as those of the first embodiment are designated with the same numerals, and detailed explanations thereof have been omitted.

In a slide seat device 10' of the present embodiment, the structures of upper rails 35', lock release levers 47', and lock springs (biasers) 63' differ to those of the corresponding members of the slide seat device 10.

The fundamental structure of the upper rail 35' is the same as that of the upper rail 35, however, the upper rail 35' being provided with only three forward/rearward-movement restricting grooves 40, and with a downward lock-engaging portion 35a near the front end of the roof portion 36a are features that differ from the upper rail 35.

The fundamental structure of the lock release lever 47' is the same as that of the lock release lever 47, and similarly with the lock release lever 47, is provided with a rail-incorporated portion 47a and a connecting portion 55. A lock-spring insertion hole 47e and a front lock-spring engaging hole 47f are formed in a roof portion which is positioned in front of a rotational contact protrusion 50 of the lock release lever 47', and a rear lock-spring engaging hole 47g is formed in a roof portion that is near the rear end of the rail-incorporated portion 47a. Furthermore, three locking-claws (locking portions) 47h, which extend substantially horizontally outward from rear end portions of each of the left and right side walls 51 of the rail-incorporated portion 47a are integrally provided on the rail-incorporated portion 47a and are arranged in the forward/rearward direction.

The biasing spring 63' is a substantially bilaterally-symmetrical member formed by bending a metal wire rod, in the same manner as the lock spring 63; however, unlike the lock spring 63, the lock portions 64 are not provided. In addition, the rear end of the biasing spring 63' is provided with an upward projecting rear-end lock-engaging portion 67a. Whereas, at the front end of one of the lock springs 63' (on the right-side metal wire rod of the right biasing spring 63' and on the left-side metal wire rod of the left biasing spring 63'), a lateral lock-engaging portion 67b is provided, which extends toward the other metal wire rod of the biasing spring 63'; and at the front end of the other of lock springs 63' (on the left-side metal wire rod of the right biasing spring 63' and on the right-side metal wire rod of the left biasing spring 63'), an upward projecting front lock-engaging portion 67c is provided. Portions of left and right metal wire rods positioned immediately behind the lateral lock-engaging portion 67b and the front lock-engaging portion 67c respectively constitute lever pressing portions 66.

Figure 20:
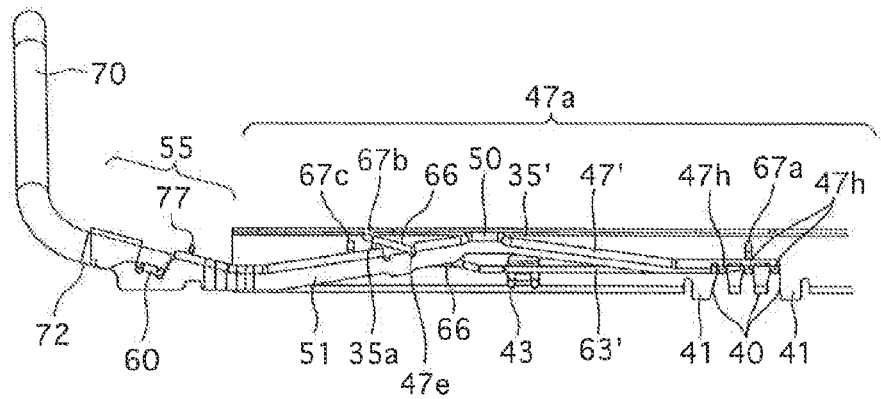
FIG. 20 is a side view similar to that of FIG. 8.
Figure 21:
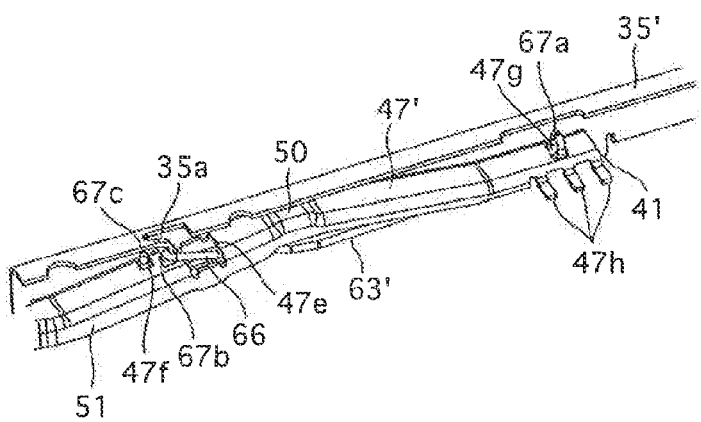
FIG. 21 is a perspective view of an upper rail, a lock-release lever, and a biasing spring, with the upper rail shown in section.

As shown in FIGS. 20 and 21, the rear-end lock-engaging portion 67a of the biasing spring 63' is lock-engaged with the rear lock-spring engaging hole 47g from below, portions of the biasing spring 63' positioned slightly rearward from the lever pressing portions 66 are respectively engaged with the left and right locking lugs 43, the front end portion of the metal wire rod at which the lateral lock-engaging portion 67b is formed projects upward from the lock release lever 47' through the lock-spring insertion hole 47e from therebelow with the lateral lock-engaging portion 67b lock-engaged with the lock-engaging portion 35a of the upper rail 35 from the front thereof, and the front lock-engaging portion 67c is lock-engaged with the front lock-spring engaging hole 47f from below. Upon assembling the biasing spring 63' onto the upper rail 35' and the lock release lever 47' in the above-described manner, the biasing spring 63' becomes movable relative to the upper rail 35' in the forward/rearward direction within a very small range such that the lock-engagement between the lateral lock-engaging portion 67b and the lock-engaging portion 35a is not released and such that the front lock-engaging portion 67c and the rear-end lock-engaging portion 67a to not come out of the front lock-spring engaging hole 47f and the rear lock-spring engaging hole 47g, respectively; and the biasing spring 63' excluding the front end (the portion of the metal wire rod on the lateral lock-engaging portion 67b side that projects upwardly from the lock-spring insertion hole 47e, and the front lock-engaging portion 67c) and the rear-end lock-engaging portion 67a is positioned in between the left and right side walls 51, in a plan view. Furthermore, when the lock release lever 47' is attached to the upper rail 35' utilizing the biasing spring 63' in such a manner, an upward biasing force (elastic force) is applied to the lock release lever 47' by the biasing spring 63' against a contact portion between the rear-end lock-engaging portion 67a of the biasing spring 63' and the front edge of the rear lock-spring engaging hole 47g, against a contact portion between the lever pressing portions 66 to which the lateral lock-engaging portion 67b is formed and the rear edge of the lock-spring insertion hole 47e, and against a contact portion between the lever pressing portions 66 to which the front lock-engaging portion 67c is formed and the rear edge of the front lock-spring engaging hole 47f, by the elastic deformation of the biasing spring 63'. Accordingly, the rotational contact protrusion 50 of the lock release lever 47' is pressed against the roof portion 36a of the base 36 by this biasing force, the lock release lever 47' becomes rotatable around the rotational contact protrusion 50 about the contact portion A between the roof portion 36a and the rotational contact protrusion 50, and the lock release lever 47' is held in the locked position shown in FIG. 20 when an upward external force is not applied to the connecting portion 55. Whereas, when an upward external force is applied to the connecting portion 55 against the biasing force of the biasing spring 63', the lock release lever 47' rotates to the unlocked position (not shown).

Upon assembling the upper rail 35', the lock release lever 47' and the biasing spring 63' into an integrated unit, in the above-described manner, each restricting lugs 41 of the upper rail 35' is positioned between the front stopper portions 29a and the rear stopper portions 29b, and furthermore, the left restricting lugs 41 are positioned on a line extending in the forward/rearward direction from the left front stopper portion 29a to the left rear stopper portion 29b, and the right front and rear restricting lugs 41 are positioned on a line extending in the forward/rearward direction from the right front stopper portion 29a to the right rear stopper portion 29b.

Figure 22:
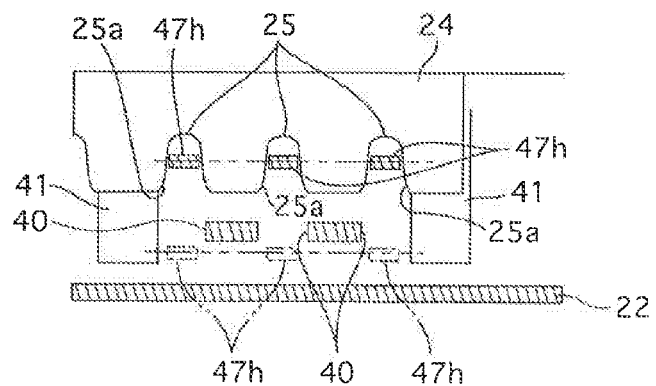
FIG. 22 is a side view similar to that of FIG. 11.

Furthermore, when the lock release lever 47' is in the locked position, as shown in FIG. 20 and by the solid lines of FIG. 22, since the locking-claws 47h of the lock release lever 47' are engaged with corresponding lock grooves 25 and the forward/rearward-movement restricting grooves 40 from below, the sliding of the upper rail 35' relative to the lower rail 21 is restricted. Whereas, if the lock release lever 47' is rotated to the unlocked position, since, as shown by the phantom line in FIG. 22, each locking-claw 47h escapes downward from the lock grooves 25 and the forward/rearward-movement restricting grooves 40, with which the locking-claws 47h were engaged, the upper rail 35' is slidable relative to the lower rail 21.

In the above-described configuration of the present embodiment, although a restricting device (the lateral lock-engaging portion 67b of the biasing spring 63' and the lock-engaging portion 35a) exists between the upper rail 35' and the lock release lever 47' which restricts the rearward movement of the lock release lever 47' relative to the upper rail 35', a device which restricts the forward movement of the lock release lever 47' relative to the upper rail 35' does not exist.

However, when the lock release lever 47' is in the locked position, since the locking-claws 47h of the lock release lever 47' are engaged with the lock grooves 25 of the lower rail 21 and the forward/rearward-movement restricting grooves 40 of the upper rail 35', the forward/rearward movement of the lock release lever 47' relative to the upper rail 35' is restricted by this engagement. Furthermore, when the lock release lever 47' is positioned in the unlocked position, the locking-claws 47h are sometimes released downwardly from the forward/rearward-movement restricting grooves 40 of the upper rail 35 in addition to the lock grooves 25 (see the locking-claws 47h depicted by the lower phantom line in FIG. 22). However, in this case, as shown in FIG. 22, the forward/rearward movable range of the locking-claws 47h is restricted by the front and rear restricting lugs 41 to within a predetermined range. Therefore, regardless of whether the lock release lever 47' is in the locked position or the unlocked position, since the lock-engagement of the lateral lock-engaging portion 67b of the rear end of the biasing spring 63' with the lock-engaging portion 35a of the upper rail 35' is not released by a large forward movement of the lock release lever 47' relative to the upper rail 35', a steady and reliable rotational action of the lock release lever 47' relative to the upper rail 35' can be achieved.

Furthermore, when the front and rear restricting lugs 41 restrict the forward/rearward movement of the locking-claws 47h within the above-mentioned predetermined range while the lock release lever 47 is positioned at the unlocked position, even if the locking-claws 47h are released below the forward/rearward-movement restricting grooves 40, as shown in the lower phantom line FIG. 22, all of the locking-claws 47h are positioned directly below the corresponding forward/rearward-movement restricting grooves 40 (are not positioned forward from the front edges of the corresponding forward/rearward-movement restricting grooves 40 and are not positioned rearward from the rear edges of the forward/rearward-movement restricting grooves 40). Accordingly, when the lock release lever 47' is thereafter moved back to the locked position, the locking-claws 47h which are moved upward and pass through the corresponding forward/rearward-movement restricting grooves 40 smoothly enter into the corresponding lock grooves 25 while being guided by the front or rear inclined guide surfaces 25a of the lock grooves 25 (or without contacting the inclined guide surfaces 25a) until the upper portions of the lock grooves 25. Accordingly, the rail unit 20' can be securely returned to a locked state.

Although the present invention has been described based on the first and second embodiments, the present invention can be implemented while making various modifications thereto.

For instance, the lock grooves 25 and the forward/rearward-movement restricting grooves 40 can be grooves which are open at the upper ends and closed at the lower ends thereof.

Furthermore, in the first embodiment, the lock spring 63 can be (slightly) movable in only one of the forward or rearward directions relative to the upper rail 35, and in the second embodiment, the lock release lever 47' can be (slightly) movable in only one of the forward or rearward directions relative to the upper rail 35'.

Furthermore, in the first embodiment, the lock spring 63 and the lock release lever 47 can be mutually lock-engaged so that the lock spring 63 is movable in the forward direction (immovable in the rearward direction) relative to the lock release lever 47, and in the second embodiment, the biasing spring 63' and the lock release lever 47' can be mutually lock-engaged so that the biasing spring 63' movable in the rearward direction (immovable in the forward direction) relative to the lock release lever 47'. Furthermore, a lock-engaging device between the lock spring 63 and the lock release lever 47, or between the biasing spring 63' and the lock release lever 47', which restricts the forward/rearward movement thereof can be omitted.

Industrial Applicability

In the slide rail device for vehicle according to the present invention, when the lock release lever is rotated to the unlocked position, since the locking portion can be mechanically restricted from moving forwardly or rearwardly from the corresponding forward/rearward-movement restricting grooves by the restricting lugs, upon the locking portion coming out from the forward/rearward-movement restricting grooves and the lock-release lever returning to the locked position, the locking portion smoothly moves into the forward/rearward-movement restricting grooves, and accordingly, it is possible to securely return to a locked state.

Reference Signs List 10 10' Slide seat device
11 Seat
15 Slide rail device
20 20' Rail unit
21 Lower rail
22 Bottom wall
22a Bolt insertion hole
22b Positioning hole
23 Outer wall portion
24 Inner wall portion
25 Lock grooves
25a Inclined guide surfaces
27 Spacer 28 Through-hole
29a Front stopper portion
29b Rear stopper portions
30 Fixing bolt (fixing member)
31 Head (projecting portion)
32 Flange
33 Threaded portion
35 35' Upper rail
35a Lock-engaging portion
36 Base
36a Roof portion
36b Side wall portion
37 Lever accommodating groove
38 Upright wall
39 Locking wall
40 Forward/rearward-movement restricting grooves
41 Restricting lugs
42 43 Locking lug
47 47' Lock release lever
47a Rail-incorporated portion
47b Ridge
47c Rib
47d Base wall
47e Lock-spring insertion hole
47f Front lock-spring engaging hole
47g Rear lock-spring engaging hole
47h Locking-claws
48 Middle portion
48a Receptive depressed portion
49 Narrow-width portion
50 Rotational contact protrusion (rotational contact portion)
51 Side wall
52 Spring-hook groove (first engaging portion)
52b Ridge
53 Lock-spring catching hole (second engaging portion)
54 Spring locking hole
55 Connecting portion
56 Front restricting portion
57 Front allowance space
58 Depressed portion
59 Rear allowance space
60 Rear restricting lug
60a Rear restricting portion
61 Connecting space
63 Lock spring (biaser)
63' Biasing spring (biaser)
64 Lock portion (lock portion)
65 Front-end locking lug
66 Lever pressing portion
67a Rear-end lock-engaging portion
67b Lateral lock-engaging portion
67c Front lock-engaging portion
68 Retainer
69 Bearing ball
70 Loop handle (handle)
71 Grip portion
72 Rear-end connecting portion
73 Lower contact surface
74 Lock-engaging groove
76 Torsion spring (biaser)
77 Upwardly projecting lug
78 Front locking portion
79 80 Locking projection
A Contact portion
F Floor board
F1 Screw hole
F2 Positioning hole
N Weld nut
P Positioning pin

The invention claimed is:

1. A slide rail device for a vehicle comprising:
a lower rail which extends in a forward/rearward direction and is provided with lock grooves which extend in an upward/downward direction and are open at one end thereof;
an upper rail which is supported by said lower rail to be slidable in said forward/rearward direction;
a lock release lever which is provided with a rail-incorporated portion positioned between said upper rail and a bottom wall of said lower rail, and supported by said upper rail to be upwardly/downwardly rotatable between a locked position and an unlocked position;
forward/rearward-movement restricting grooves which are formed on said upper rail, said forward/rearward-movement restricting grooves extending in the upward/downward direction and are open at the same end as that of said lock grooves;
lock portions which are formed on a member which moves together with said lock release lever, which are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock grooves and said forward/rearward-movement restricting grooves when said lock release lever is positioned at said unlocked position; and
restricting lugs which are formed on said upper rail and are positioned so that said forward/rearward-movement restricting grooves are interposed between said restricting lugs in the longitudinal direction of said upper rail, said restricting lugs protruding beyond the open ends of said forward/rearward-movement restricting grooves in a direction from closed ends of said forward/rearward-movement restricting grooves, so that said forward/rearward-moveable range of the lock portions is mechanically restricted by said restricting lugs when said lock release lever is positioned in said unlocked position.

2. The slide rail device for a vehicle according to claim 1, further comprising:
a rotational contact portion formed on an upper surface of said rail-incorporated portion, said rotational contact portion contacting a roof surface of said upper rail; and
a biaser which biases said rail-incorporated portion toward said roof surface.

3. The slide rail device for a vehicle according to claim 2, wherein said biaser comprises said lock portions, and wherein said biaser rotationally biases said lock release lever toward said locked position.

4. The slide rail device for a vehicle according to claim 1, wherein stopper portions, which can come in contact with said restricting lags, are provided on said lower rail and are positioned on a straight line extending in the forward/rearward direction and through said restricting lugs.

5. A slide rail device for a vehicle comprising:
a lower rail which extends in a forward/rearward direction and is provided with lock grooves which extend in an upward/downward direction and are open at one end thereof;
an upper rail which is supported by said lower rail to be slidable in said forward rearward direction;
a lock release lever which is provided with a rail-incorporated portion positioned between said upper rail and a bottom wall of said lower rail, and supported by said upper rail to be upwardly/downwardly rotatable between a locked position and an unlocked position;

forward/rearward-movement restricting grooves which are formed on said upper rail, said forward/rearward-movement restricting grooves extending in the upward/downward direction and are open at the same end as that of said lock grooves;

lock portions which are formed on a locking spring which moves together with said lock release lever, which are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock, grooves and said forward/rearward-movement restricting grooves when said lock release lever is positioned at said unlocked position; and restricting lugs which are formed on said upper rail and are positioned so that said forward/rearward-movement restricting grooves are interposed between said restricting lugs in the longitudinal direction of said upper rail, said restricting lugs protruding beyond the open ends of said forward/rearward-movement restricting grooves in a direction from closed ends of said forward/rearward-movement restricting grooves, so that said forward/rearward-movable range of the lock portions is mechanically restricted by said restricting lugs when said lock release lever is positioned in said unlocked position.

6. A slide rail device for a vehicle comprising:

a lower rail which extends in a forward/rearward direction and is provided with lock grooves Which extend in an upward/downward direction and are open at one end thereof;

an upper rail which is supported by said lower rail to be slidable in said forward/rearward direction;

a lock release lever which is provided with a rail-incorporated portion positioned between said upper rail and a bottom wall of said lower rail, and supported by said upper rail to be upwardly/downwardly rotatable between a locked position and an unlocked position;

forward/rearward-movement restricting grooves which are formed on said upper rail, said forward/rearward-movement restricting grooves extending in the upward/downward direction and are open at the same end as that of said lock grooves;

locking claws which are formed on said lock release lever and are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock grooves and said forward/rearward-movement restricting grooves when said lock release lever is positioned at said unlocked position; and restricting lugs which are formed on said upper rail and are positioned so that said forward/rearward-movement restricting grooves are interposed between said restricting lugs in the longitudinal direction of said upper rail, said restricting lugs protruding beyond the open ends of said forward/rearward-movement restricting grooves in a direction from closed ends of said forward/rearward-movement restricting grooves, so that said forward/rearward-movable range of the lock portions is mechanically restricted by said restricting lugs when said lock release lever is positioned in said unlocked position.

7. A slide rail device for a vehicle comprising:

a lower rail which extends in a forward/rearward direction and is provided with lock grooves which extend in an upward/downward direction and are open at one end thereof;

an upper rail which is supported by said lower rail to be slidable in said forward/rearward direction;

a lock release lever which is provided with a rail-incorporated portion positioned between said upper rail and a bottom wall of said lower rail, and supported by said upper rail to be upwardly/downwardly rotatable between a locked position and an unlocked position;

forward/rearward-movement restricting grooves which are formed on said upper rail, said forward/rearward-movement restricting grooves extending in the upward/downward direction and are open at the same end as that of said lock grooves;

lock portions which are formed on a member which moves together with said lock release lever, which are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock grooves and said forward/rearward-movement restricting grooves when said lock release lever is positioned at said unlocked position; and at least one restricting lug which is formed on said upper rail, said restricting lug protruding beyond the open ends of said forward/rearward-movement restricting grooves in a direction from dosed ends of said forward/rearward movement restricting grooves, so that said forward/rearward-movable range of the lock portions is mechanically restricted by said restricting lug when said lock release lever is positioned in said unlocked position.

8. A slide rail device for a vehicle comprising:

a lower rail which extends in a forward/rearward direction and is provided with lock grooves which extend in an upward/downward direction and are open at one end thereof;

an upper rail which is supported by said lower rail to be slidable in said forward/rearward direction;

a lock release lever which is provided with a rail-incorporated portion positioned between said upper rail and a bottom wall of said lower rail, and supported by said upper rail to be upwardly/downwardly rotatable between a locked position and an unlocked position;

forward/rearward-movement restricting grooves which are formed on said upper rail, said forward/rearward-movement restricting grooves extending in the upward/downward direction and are open at the same end as that of said lock grooves;

lock portions which are formed on a locking spring which moves together with said lock release lever, which are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock grooves and said forward/rearward-movement restricting grooves when said lock release lever is positioned at said unlocked position; and at least one restricting lug which is formed on said upper rail, said restricting lug protruding beyond the open ends of said forward/rearward-movement restricting grooves in a direction from closed ends of said forward/rearward-movement restricting grooves, so that said forward/rearward-movable range of the lock portions is mechanically restricted by said restricting lug when said lock release lever is positioned in said unlocked position.

9. A slide rail device for a vehicle comprising:

a lower rail which extends in a forward/rearward direction and is provided with lock grooves which extend in an upward/downward direction and are open at one end thereof;

an upper rail which is supported by said lower rail to be slidable in said forward/rearward direction;

a lock release lever which is provided with a rail-incorporated portion positioned between said upper rail and a bottom wail of said lower rail, and supported by said upper rail to be upwardly/downwardly rotatable between a locked position and an unlocked position;

forward/rearward-movement restricting grooves which are formed on said upper rail, said forward/rearward-movement restricting grooves extending in the upward/downward direction and are open at the same end as that of said lock grooves;

locking claws which are formed on said lock release lever and are movable in at least one of the forward direction and the rearward direction relative to said upper rail, wherein said lock portions are lock-engaged with said lock grooves and said forward/rearward-movement restricting grooves when said lock release lever is positioned at said locked position, and wherein said lock portions are released from said lock grooves and said forward/rearward-movement restricting grooves when said lock release lever is positioned at said unlocked position; and at least one restricting lug which is formed on said upper rail, said restricting lug protruding beyond the open ends of said forward/rearward-movement restricting grooves in a direction from closed ends of said forward/rearward-movement restricting grooves, so that said forward/rearward-movable range of the lock portions is mechanically restricted by said restricting lug when said lock release lever is positioned in said unlocked position.

* * * * *

UNITED STATES PATENT AND TRADEMARK OFFICE
CERTIFICATE OF CORRECTION

PATENT NO.         : 8,757,577 B2
APPLICATION NO.    : 13/746799
DATED              : June 24, 2014
INVENTOR(S)        : Hayashi Naoki Page 1 of 1

It is certified that error appears in the above-identified patent and that said Letters Patent is hereby corrected as shown below:

In the Claims:

Column 16, Line 56 reads: "said restricting lags, are provided on said lower rail and are" should read --said restricting lugs, are provided on said lower rail and are--.

Column 17, Line 17 reads: "released from said lock, grooves and said forward/rear-" should read --released from said lock grooves and said forward/rear- --.

Column 17, Line 33 reads: "and is provided with lock grooves Which extend in an" should read --and is provided with lock grooves which extend in an--.

Column 19, Line 20 reads: "bottom wail of said lower rail, and supported by said" should read --bottom wall of said lower rail, and supported by said--.

Signed and Sealed this
Fourth Day of November, 2014

Michelle K. Lee
*Deputy Director of the United States Patent and Trademark Office*